United States Patent [19]
Son

[11] Patent Number: 5,812,510
[45] Date of Patent: Sep. 22, 1998

[54] DISC PLAYER WITH A GEAR MECHANISM IN WHICH A DISC TRAY AND A DISC CLAMPING DEVICE ARE LINKED IN GEAR BY A GEAR GROUP

[75] Inventor: Kwan Ho Son, Seoul, Rep. of Korea

[73] Assignee: Daewoo Electronics Co., Ltd., Seoul, Rep. of Korea

[21] Appl. No.: 639,644

[22] Filed: Apr. 29, 1996

[30] Foreign Application Priority Data

Apr. 29, 1995 [KR] Rep. of Korea .................. 1995 10924

[51] Int. Cl.$^6$ ..................................................... G11B 17/04
[52] U.S. Cl. .......................................... 369/75.2; 369/77.1
[58] Field of Search ................................. 369/75.1, 75.2, 369/77.1; 360/99.02, 99.03, 99.06, 99.07

[56] References Cited

U.S. PATENT DOCUMENTS

| | | | |
|---|---|---|---|
| 4,654,840 | 3/1987 | Takahashi | 369/75.2 |
| 4,680,748 | 7/1987 | Kobayashi | 369/77.1 |
| 5,204,850 | 4/1993 | Obata | 369/75.2 |
| 5,217,593 | 6/1993 | Kaneo et al. | 369/77.1 |

*Primary Examiner*—Stuart S. Levy
*Assistant Examiner*—William R. Korzuch
*Attorney, Agent, or Firm*—Sixbey Friedman Leedom & Ferguson; Frank P. Presta

[57] ABSTRACT

In a disc player, a disc tray has a first rack which is formed on a lower surface of the disc tray along a direction in which a disc is to be transferred. A first and of a clamping device is rotated about a second end of the clamping device which serves as a rotational axis for clamping the disc transferred by the disc tray, and the first end is provided with a second rack. The disc tray and the disc clamping device are connected with each other by only a gear group. A first gear of the gear group is engaged with the first rack of the disc tray and a second gear is engaged with the second rack of the clamping device. In a loading operation of the disc, the disc tray is transferred to a loading position and simultaneously the clamping device is upwardly rotated on the rotational axis due to rotation of gears of the gear group, and thereby the disc can be compressed and played.

4 Claims, 4 Drawing Sheets

DISC PLAYER WITH A GEAR MECHANISM IN WHICH A DISC TRAY AND A DISC CLAMPING DEVICE ARE LINKED IN GEAR BY A GEAR GROUP

BACKGROUND OF THE INVENTION

1. Field of the Invention

The present invention relates to a disc player and more particularly, to a disc player for completing loading and unloading operations by a simple machinery mechanism such that a disc tray and a disc clamping device are connected with each other by only a gear group.

2. Description of the Prior Arts

Disc players for reproducing audio signals from compact discs or the like having the signals recorded thereon generally have a tray provided at an opening in the front panel of a housing and movable into and out of the housing, and further include, as arranged inside the housing, a tray drive mechanism for driving the tray with the disc placed thereon to transport the disc toward a turntable inside the housing, a disc clamping mechanism for pressing the disc against the turntable, and a pickup transport mechanism for reciprocatingly transporting a pickup radially of the disc on the turntable for the pickup to reproduce signals. The opening portion of the housing is further provided with a shutter mechanism for closing the housing opening after the disc has been loaded into the housing.

Disc clamping mechanism already known include, for example, those of the type wherein a clamp lever pivotally movably supported on a chassis is driven toward the turntable by a drive mechanism provided specifically therefor to clamp the disc onto the turntable.

The conventional disc player, e.g., a compact disc player, having clamping mechanism in which a clamp lever pivotally movably supported on a chassis which compresses the disc on the turntable is driven toward the turntable will be described in detail with reference to FIGS. 1 to 3.

FIG. 1 is a plan view for showing a conventional compact disc player in disc-loaded state. FIG. 2 is a front sectional view for showing the compact disc player of FIG. 1. FIG. 3 is a side sectional view for showing the compact disc player of FIG. 1.

As shown in the figures, a reference numeral 10 denotes a driving motor. A change gear 20 is engaged with driving motor 10 and serves to transform the speed of gears in the desired rates by driving operation of the driving motor. Change gear 20 is engaged with a rack 31 of a tray 30. Tray 30 is horizontally transferred by rotation of change gear 20. Tray 30 is to seat the disc on the upper surface thereof and has a curve groove 32 on the lower surface thereof. A moving plate 40 is installed under tray 30. Moving plate 40 has horizontal transferring guide projectors 41 which are upwardly projected on the top surface thereof to be inserted into curve groove 32 of tray 30. On the side of moving plate 40 are formed guide slots 42 which have shapes of inclined curves. A turntable 52 is installed on an end of a clamping device 50 for reproducing compact disc D. A turntable driving apparatus is installed for driving turntable 52 under turntable 52. The other end of clamping device 50 is fixed. Clamping device 50 is rattled centering on the fixed end. The end of clamping device 50 in which turntable is installed is rotated upward and downward centering on the fixed end of the clamping device 50. The guide rods 51 are outwardly projected on the side wall of the end of clamping device 50 in which turntable 52 is installed. Guide rods 51 are slidably inserted into guide slots 42 of the inclined shape in moving plate 40. An opening 33 is formed at the center of tray 30, so that, when loading, clamping devise 50 is rotated and turntable 52 formed on the rotating end of the clamping device 30 is inserted throughout the opening 33, and then the clamping device upwardly compresses the compact disc D on tray 30 to reproduce information of the compact disc D.

Hereinafter, an operation of the conventional disc player according the above mentioned description will be described.

First of all, after ejecting a side of tray 30 outward of the disc player by pressing the eject button (not shown) one set the compact disc on the upper surface of tray 30.

If one presses the inserting button (not shown) or pushes the tray 30 to the inside of the disc player, i.e., pushes the tray 30 in the direction of arrow A, then driving motor 10 is driven, and thereby change gear 20 is rotated to carry out speed change of gear. Since this change 20 is engaged with rack 31 formed on the lower surface of tray 30, tray 30 is transferred to the inside of the disc player, i.e., in the direction of arrow A by the rotation of the change gear 20. Simultaneously with this, the horizontal transferring guide projector 41 of moving places 40 which is inserted into the curve groove 32 is slid from the position indicated by a dotted line to the position indicated by a solid line along the curve groove 32. That is to say, as shown FIG. 1, moving plate 40 is moved in the direction of arrow B and simultaneously to the inside of the disc player. As shown in FIG. 2, since moving plate 40 is moved in the direction of arrow B, the guide rods 51 which are formed on the rotating side of the clamping device 50 and inserted into the guide slots 42 of moving plate 40 are upwardly transferred from the position indicated by a dotted circle to the position indicated by a solid circle along the guide slots 42. Due to the upward movement, as shown in FIG. 3, clamping device 50 is rotated on rotating axis 53 from the position of a dotted line to the position of a solid line. Therefore, turntable 52 installed on the rotating side is upwardly moved.

Consequently, when inserting tray 30, turntable 52 installed on the rotating side of clamping device 50 is inserted through opening 33 of the center of tray 30 to compress disc D from below.

Therefore, if one presses the play button then turntable 52 and compact disc are rotated by turntable driving motor 70, and thereby information is reproduced by the optional pickup.

However, according to the above-mentioned conventional compact disc player, when loading the disc, tray has guide grooves, moving plate is guided by these guide grooves, the moving plate has guide slots, and clamping device and turntable are guided by these guide slots, and thereby constituent elements and inter-relations between these constituent elements are highly complicated, resulting in complication of the disc player.

SUMMARY OF THE INVENTION

The present invention is intended to overcome the above-mentioned and numerous other disadvantages and deficiencies of the prior art. Therefore, it is an object of the present invention to provide a disc player for completing loading and unloading operations by a simple machinery mechanism such that a disc tray and a disc clamping device are connected with each other by only a gear group.

To achieve the above-describe object of the present invention, a disc player comprises:

a disc tray having a first rack which is formed on a lower surface of the disc tray along direction which a disc is to be transferred;

a clamping device for clamping the disc transferred by the disc tray, a first end of the clamping device being rotated on a second end of the clamping device which serves as a rotating axis, and the first end being provided with a second rack;

a gear group having a first gear engaged with the first rack of the disc tray and a second gear engaged with the second rack of the clamping device in loading and unloading disc, the disc tray is transferred along the first rack direction, the first gear is rotated in an engaged state with the first rack, and clamping device is rotated on the rotating axis by the second rack of the clamping device which is engaged with the second gear.

In the disc player of the present invention the second rack of the first end of the clamping device has an arch shape centering around the second end which is a rotating axis, so that the clamping device is rotated on the second end upwardly to the disc or downwardly against the disc depending on rotating directions of the second gear engaged with the second rack, In the disc player of the present invention the clamping device further comprises turntable installed on the first end of the clamping device, so that the clamping device compresses the disc and simultaneously turntable is rotated, and thereby information of the disc is reproduced.

The gear group further comprises a change gear rotated by a driving motor.

The first gear of the gear group comprises double gears having a gear engaged with the first rack and a gear engaged with the change gear for changing a speed rate.

The second gear of the gear group comprises at least one intermediate gear, so that the clamping device is moved in the direction that is compressed when disc tray is inserted into the disc player, and the clamping device is moved in the direction that disc is released when disc tray is ejected from the disc player.

According to the disc player of the present invention, the disc tray and the disc clamping device are connected with each other by only a gear group. The first gear of the gear group is engaged with the first rack of the disc tray and the second gear of the gear group is engaged with the second rack of the clamping device. Thus, in the loading operation of the disc, with rotation of the gears of the gear group, the disc tray is transferred to the loading position and simultaneously the rotating end of clamping devise is upwardly rotated on the other end as the rotating axis, and thereby disc can be compressed and played.

BRIEF DESCRIPTION OF THE DRAWINGS

The present invention may be better understood and its numerous objects and advantages will be more apparent to those skilled in the art by reference to the accompanying drawings in which.

DETAILED DESCRIPTION OF THE PREFERRED EMBODIMENT

The preferred embodiments of this invention will be described in detail with reference to the accompanying drawings.

Figure 1:
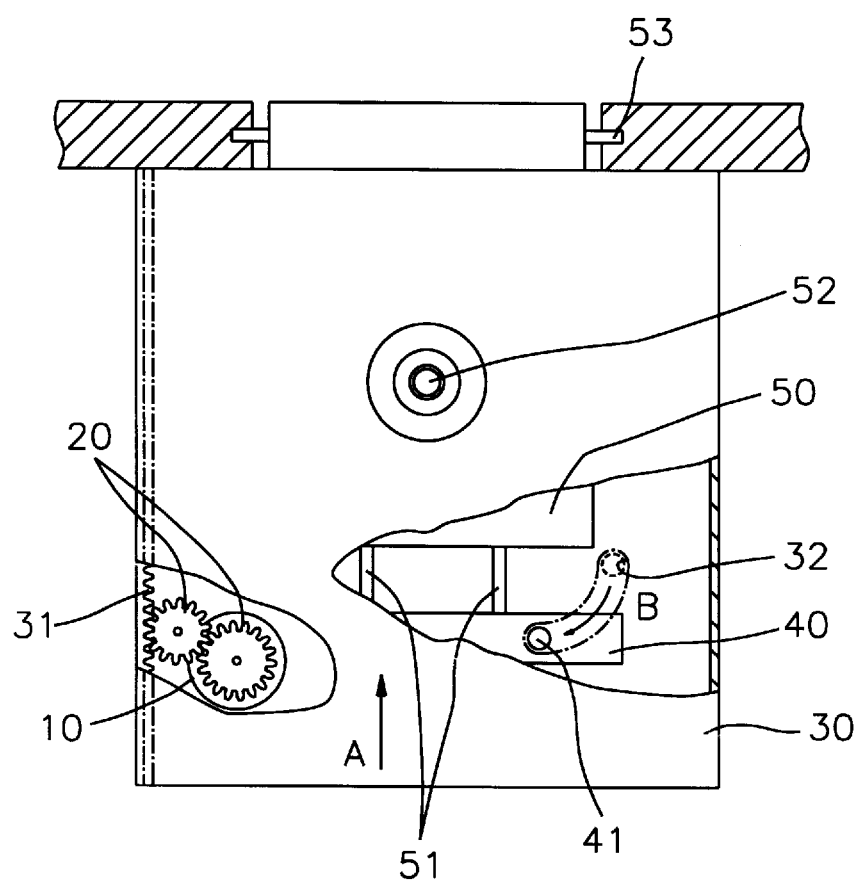
FIG. 1 is a plan view for showing a conventional compact disc player in disc-loading state.
Figure 2:
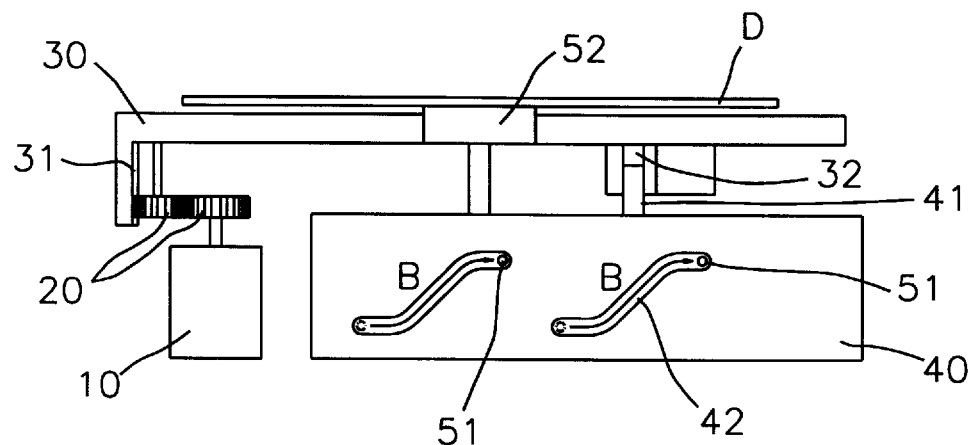
FIG. 2 is a front sectional view for showing the compact disc player of FIG. 1.
Figure 3:
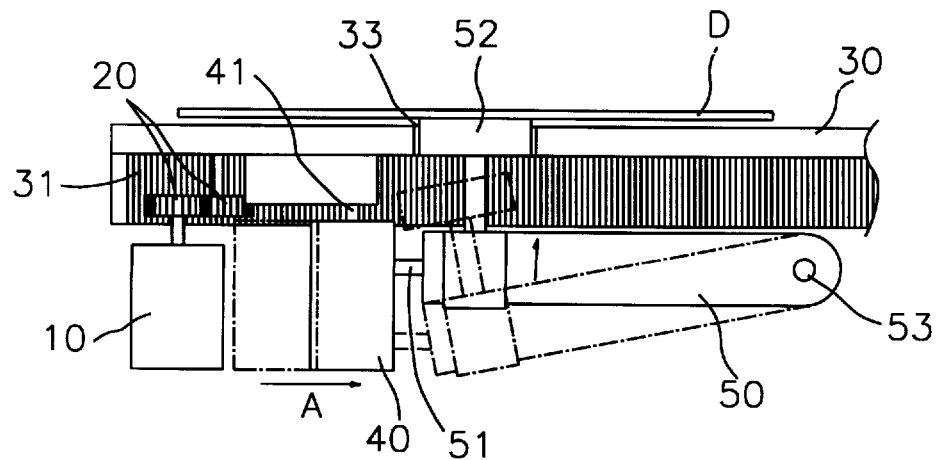
FIG. 3 is a side sectional view for showing the compact disc player of FIG. 1.
Figure 4:
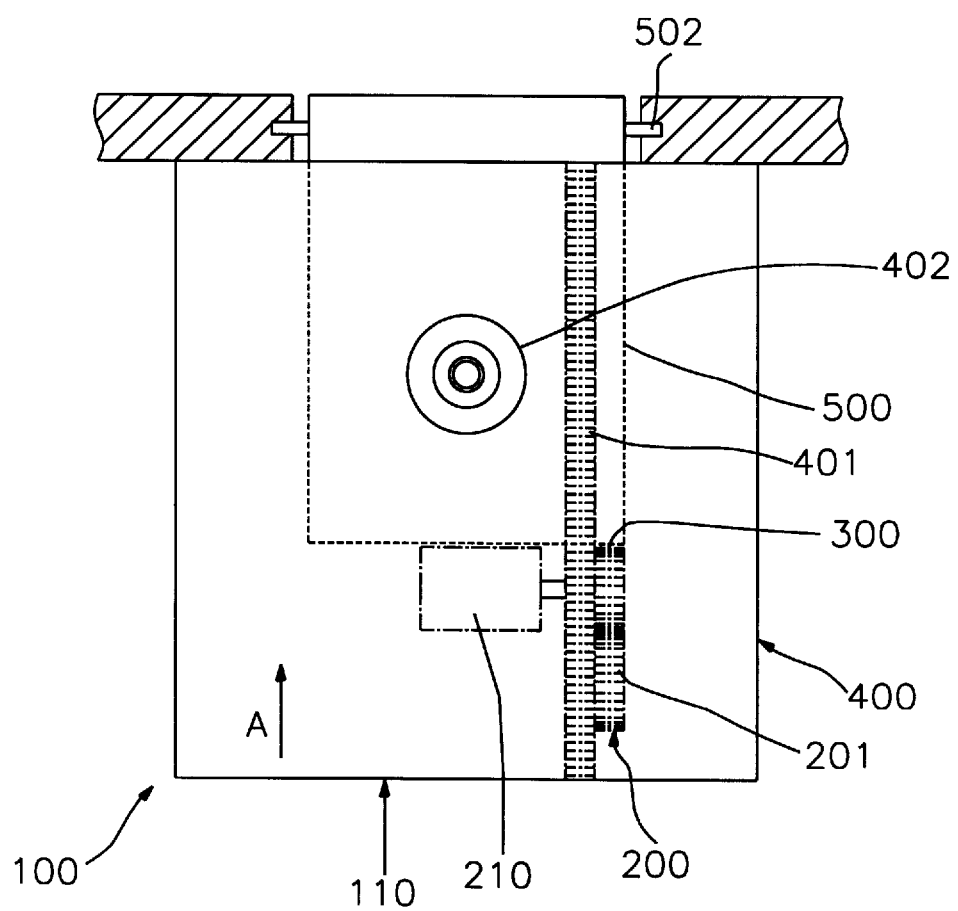
FIG. 4 is a plan view for showing a compact disc player of the present invention.
Figure 5:
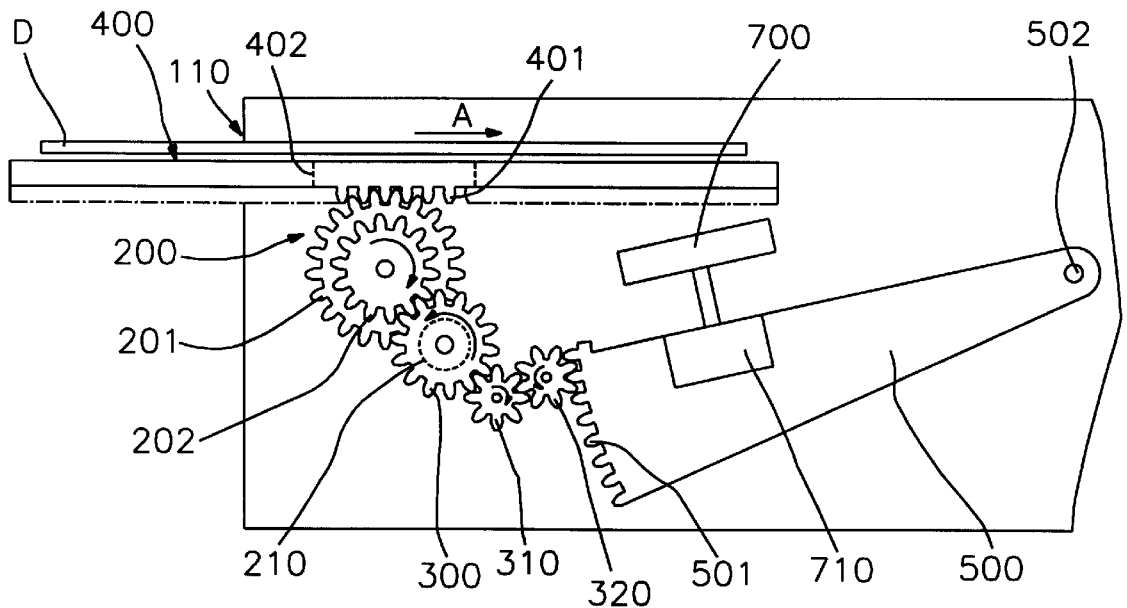
FIG. 5 is a side sectional view for showing the compact disc player of FIG. 4 before disc is loaded.
Figure 6:
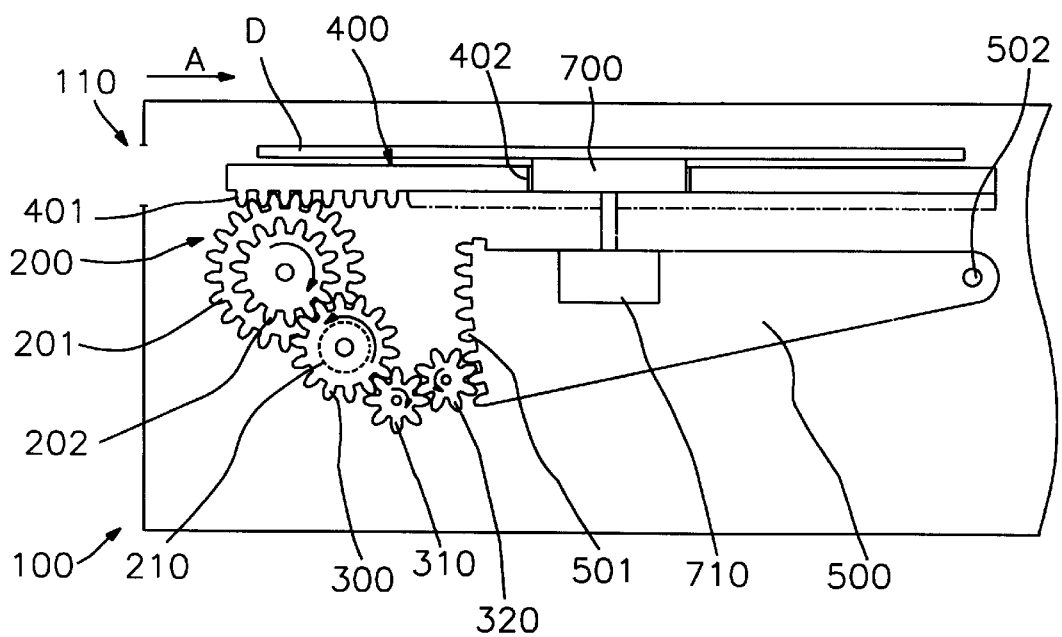
FIG. 6 is a side sectional view for showing the compact disc player of FIG. 4 after disc is loaded.

FIG. 4 is a plan view for showing a compact disc player of the present invention, FIG. 5 is a side sectional view for showing the compact disc player of FIG. 4 before disc is loaded, and FIG. 6 is a side sectional view for showing the compact disc player of FIG. 4 after disc is loaded.

In the compact disc player of the present invention, as shown in the drawings, a housing 100 of the disc player is provided with opening 110 which is installed at a predetermined position at the front of housing 100 and which disc tray goes through for inserting a disc D.

Disc tray 400 is installed such that disc seated on the tray 400 can be inserted into and ejected from the disc player through opening 110. Disc D is to be seated on disc tray 400, and a first rack 401 is formed on the bottom surface of tray 400 along the transferring direction of tray 400 in loading operation. Disc tray 400 has a through hole 402 of predetermined size at the center thereof, and thereby turntable 700 is disposed within through hole 402 when disc D has been loaded.

Clamping device 500 has one end 502 fixed to the housing 100. The fixed end 502 of clamping device 500 is set up as a rotational axis. The another end of clamping device 500 is rotated on the rotational axis vertically to the surfaces of disc D and disc tray 400. The another end of clamping device 500, i.e., the rotating end opposite to the end of the rotational axis has turntable thereon. In completion of loading operation, turntable 700 formed on the rotating end of clamping device 500 compresses disc at the center of disc tray 400. Turntable 700 is rotated by turntable driving motor 710 to rotate disc D. The rotating end has an arch-shaped side surface centering around the rotating axis, and a second rack 501 is formed along the arched side surface.

The first rack 401 formed on the bottom surface of tray 400 is engaged with a large gear 201 of a double gear 200 which comprises a large gear 201 and a small gear 202. A change gear 300 is engaged with small gear 202 for changing the speed rate. Change gear 300 is connected to a driving motor 210 to be rotated by driving motor 210. Change gear 300 is connected to first intermediate gear 310, the first intermediate gear 310 is engaged with second intermediate gear 320, and the second intermediate gear 320 is engaged with the arched second rack 501 of clamping device 500.

Hereinafter, an operation of the disc player according the present embodiment will be described.

First, one presses an eject button (not shown) of the disc player, and then seats a desired compact disc D on the disc tray 400.

As shown in FIG. 5, if one rotates counterclockwise driving motor 210 by pressing the inserting button, change gear 300 connected to driving motor 210 is rotated counterclockwise.

Small gear 202 of double gear 200 engaged with change gear 300 is rotated clockwise, and large gear 201 is also rotated clockwise. Since large gear 201 of double gear 200 is engaged with the first rack 401 of tray 400, tray 400 is transferred to the inside of disc player along the first rack 401, i.e., in the direction of arrow A as shown in FIG. 5 and FIG. 6.

Change gear 300 is engaged with the first intermediate gear 310, the first intermediate gear is engaged with the second intermediate gear 320, and the second intermediate gear 320 is engaged with the arched second rack 501 of clamping device 500. When change gear 300 is rotated counterclockwise, first and second intermediate gears 310, 320 and clamping device 500 are respectively rotated clockwise, counterclockwise, and clockwise. Thus, the rotating end of clamping device 500 is upwardly moved, and in completion of disc loading turntable 700 formed on the rotating end of clamping device 500 compresses disc D through the hole 402 of the disc tray 400, and simultaneously, turntable 700 is rotated by turntable driving motor 710 installed below turntable 700, and thereby disc D is rotated.

When disc D is rotated, information of disc D is reproduced by an optical pickup (not shown).

In unloading disc D, if one presses the eject button (not shown), disc is ejected by the reverse above-described operations. That is, driving motor 210 is rotated clockwise and change gear 300 is rotated clockwise. Gears 201, 202 of double gear 200 are rotated counterclockwise, and tray 400 is horizontally moved along the first rack 401 to be ejected from the disc player.

When change gear 300 is rotated clockwise, first and second intermediate gears 310, 320 and clamping device 500 are respectively rotated counterclockwise, clockwise, and counterclockwise, and turntable 700 of clamping device 500 is downwardly moved.

In the disc player of the present invention, the disc tray and the disc clamping device are connected with each other by only a gear group. The first gear of gear group is engaged with the first rack of the disc tray, the second gear being engaged with the second rack of the clamping device. In loading operation of disc, the disc tray is transferred and simultaneously the clamping device is upwardly rotated on the rotational axis due to rotation of gears of the gear group, and thereby disc can be compressed and played.

Thus, according to the disc player of the present invention, loading and unloading operations are performed by only a simple construction of gears and by a simple machinery mechanism without the moving plate used in the prior art, so that an internal construction has become simpler and the manufacturing cost is decreased.

It is understood that various other modification will be apparent to and can be readily made those skilled in the art without departing from the scope and spirit of this invention. Accordingly, it is not intended that the scope of the claims appended thereto be limited to the description as set forth herein, but rather that the claims be constructed as encompassing all the features of the patentable novelty that reside in the present invention, including all the features that would be treated as equivalents thereof by those skilled in the art to which this pertains.

What is claimed is:

1. A disc player comprising:

a disc tray having a first linear rack which is formed on a lower surface of the disc tray along a direction in which a disc is to be transferred;

a clamping device for clamping the disc transferred by the disc tray, a first end part of the clamping device being rotated about a second end part of the clamping device which serves as a rotational axis, and the first end part being provided with a second rack, the second rack having an arch shape centering around the second end part which is the rotational axis; and a gear group having a first gear part linked in gear with the first rack of the disc tray and composed of gears engaged with one another, and a second gear part linked in gear with the second rack of the clamping device and composed of gears engaged with one another, and the first gear part and second gear part being linked in gear with each other, the first gear part of the gear group having a change gear which is rotated by a driving motor and linked in gear with the second gear part of the gear group, and the first gear part of the gear group having a double gear having one gear engaged with the first rack of the disc tray and the other gear connected with the change gear for changing a speed rate, the gear group having such a mechanism that when the driving motor is driven, the change gear is rotated, the double gear engaged with the change gear is rotated, and then the disc tray is transferred along the first rack direction because the first rack of the disc tray is linked with the first gear part, the second gear part is driven because the second gear part is linked with the first gear part, and the clamping device is rotated about the rotational axis because the second rack of the clamping device is linked with the second gear part, and thereby, the clamping device is rotated toward the disc so that the clamping device clamps the disc when the disc tray has transferred into the disc player for loading the disc, and the clamping device is rotated away from the disc so that the clamping device releases the disc when the disc tray is transferred out of the disc player for unloading the disc.

2. The disc player is claimed in claim 1, wherein the clamping device further comprises a turntable installed on the first end of the clamping device, so that the clamping device compresses the disc and simultaneously the turntable is rotated for reproducing information on the disc.

3. The disc player as claimed in claim 1, wherein the second gear part of the gear group is composed of at least one intermediate gear for rotating the clamping device by being linked in gear with the first gear part in such a speed that the second gear part rotates the clamping device to clamp the disc when the disc tray has been transferred into the disc player for loading the disc.

4. A disc player comprising:

a disc tray having a first linear rack which is formed on a lower surface of the disc tray along a direction in which a disc is to be transferred;

a clamping device for clamping the disc transferred by the disc tray, a first end part of the clamping device being rotated on a second end part of the clamping device which serves as a rotational axis, and the first end part being provided with a second rack, the second rack having an arch shape centering around the second end part which is the rotational axis, so that the clamping device is upwardly rotated about the second end part toward the disc or downwardly rotated about the second end part away from the disc; and a gear group having one gear of a double gear engaged with the first rack of the disc tray, and a change gear which is engaged with the other gear of the double gear and rotated by a motor, a first intermediate gear engaged with the change gear, and a second intermediate gear which is engaged with the first intermediate gear and the second rack of the clamping device, wherein, when the change gear is rotated by the motor, the double gear and the first intermediate gear which are engaged with the change gear are respectively rotated, the disc tray of which the first rack is engaged with the double gear is transferred along the first rack direction, and the second intermediate gear is rotated by the first intermediate gear, and thus the clamping device of which the second rack is engaged with the second intermediate gear is rotated about the rotational axis, and thereby, the clamping device is rotated toward the disc so that the clamping device clamps the disc when the disc tray has transferred into the disc player for loading the disc, and the clamping device is rotated away from the disc so that the clamping device releases the disc when the disc tray is transferred out of the disc player for unloading the disc.

* * * * *